United States Patent [19]

Drozd

[11] 4,318,198
[45] Mar. 9, 1982

[54] CONVEYANCE LOADER WHEEL POSITION INDICATOR

[75] Inventor: Otto Drozd, Hialeah, Fla.

[73] Assignee: Wollard Aircraft Equipment, Inc., Miami, Fla.

[21] Appl. No.: 96,569

[22] Filed: Nov. 21, 1979

[51] Int. Cl.³ .............................................. E01D 1/00
[52] U.S. Cl. ..................................... 14/71.5; 180/6.5
[58] Field of Search ................ 14/71.5; 180/333, 6.32, 180/6.3, 6.5; 318/68, 675

[56] References Cited

U.S. PATENT DOCUMENTS

| | | | |
|---|---|---|---|
| 2,565,293 | 8/1951 | Aydelott | 180/333 X |
| 2,621,602 | 12/1952 | Pittman | 318/675 X |
| 2,682,629 | 6/1954 | Jordan | 318/675 |
| 2,798,190 | 7/1957 | Goodman | 318/675 |
| 2,876,384 | 3/1959 | Brown | 318/675 X |
| 3,038,185 | 6/1962 | Moore | 14/71.5 |
| 3,060,471 | 10/1962 | Deryen | 14/71.5 |
| 3,184,772 | 5/1965 | Moore | 14/71.5 |
| 3,369,264 | 2/1968 | Kurka | 14/71.5 |
| 3,462,784 | 8/1969 | Seipos | 14/71.5 |
| 3,561,030 | 2/1971 | Seipos | 14/71.5 |
| 3,577,838 | 5/1971 | Van Marle | 14/71.5 |
| 3,683,440 | 8/1972 | Xenakis | 14/71.5 |
| 3,694,724 | 9/1972 | Eggert | 14/71.5 |
| 3,722,617 | 3/1973 | Gacs | 14/71.5 |
| 3,771,037 | 11/1973 | Bailey | 318/628 X |
| 3,808,626 | 5/1974 | Magill | 14/71.5 |

*Primary Examiner*—Nile C. Byers, Jr.
*Attorney, Agent, or Firm*—Shanley, O'Neil and Baker

[57] ABSTRACT

An improved driving control and wheel position indicator for an extendible and retractable passenger conveyance loading ramp of the type having one end mounted for pivotal movement about a vertical axis and the other end supported on an undercarriage having steerable, driven ground engaging wheels controlled from an operator's station in a vestibule mounted for pivotal movement about a vertical axis on the movable end of the ramp. The system includes a wheel position indicator connected between the undercarriage and the movable vestibule including means for detecting the steered position of the ground engaging wheels and a visual display at the operator's station responsive to the wheel position detecting means for continuously indicating the true bearing of the ground engaging wheels regardless of the rotative position of the vestibule about its vertical pivot axis.

12 Claims, 8 Drawing Figures

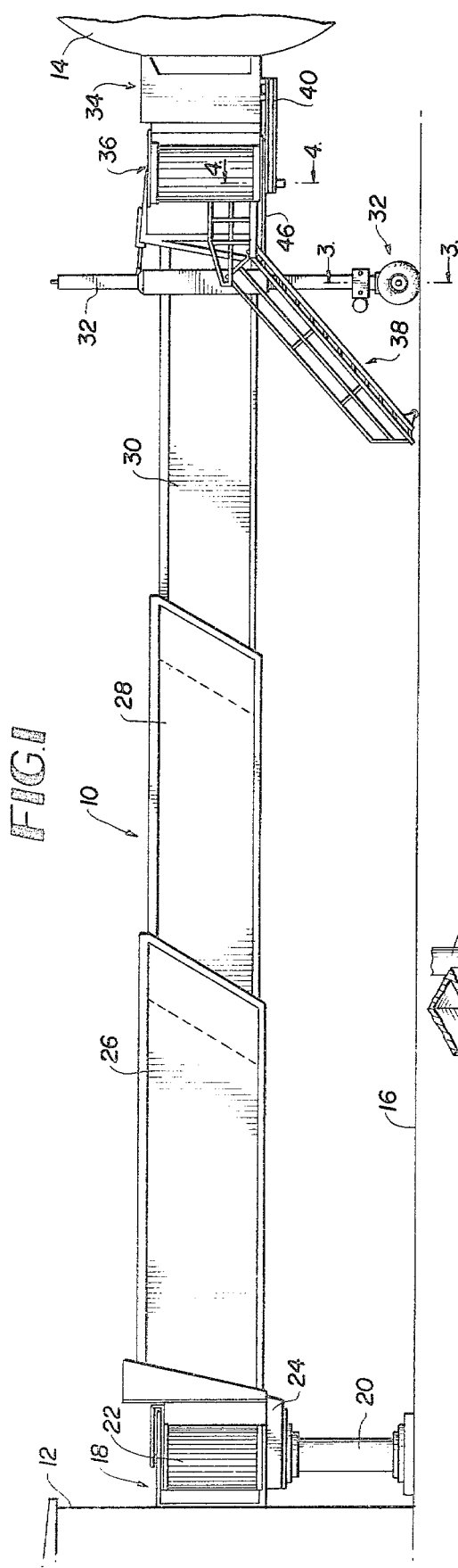
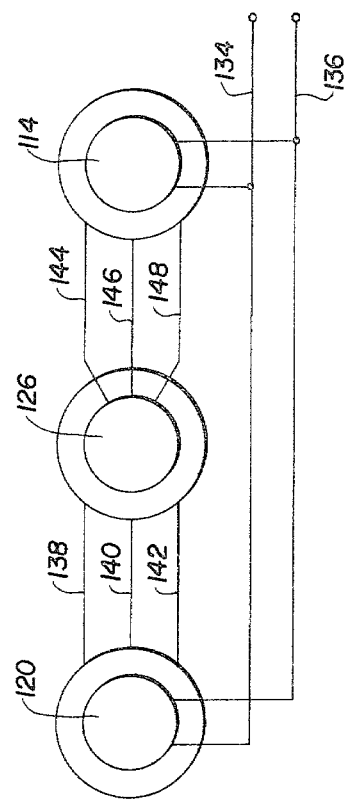
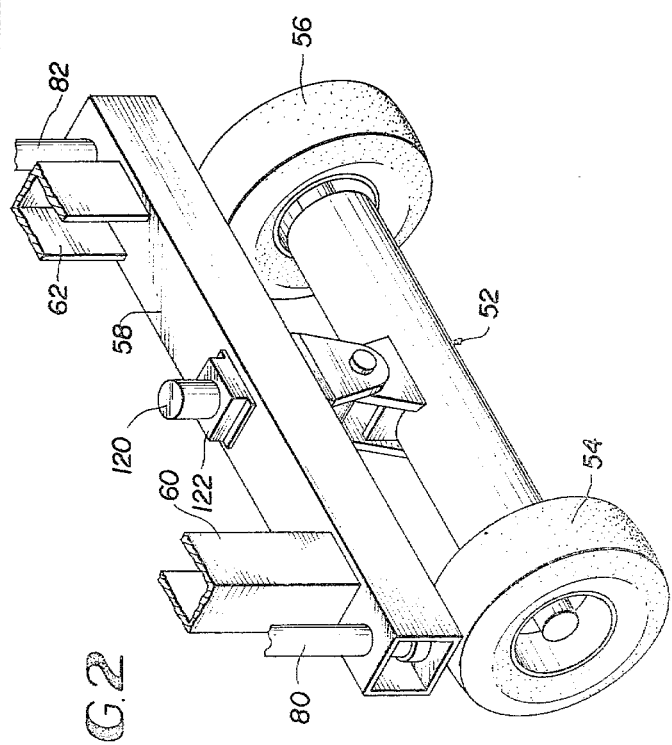
FIG.1
FIG.2
FIG.8

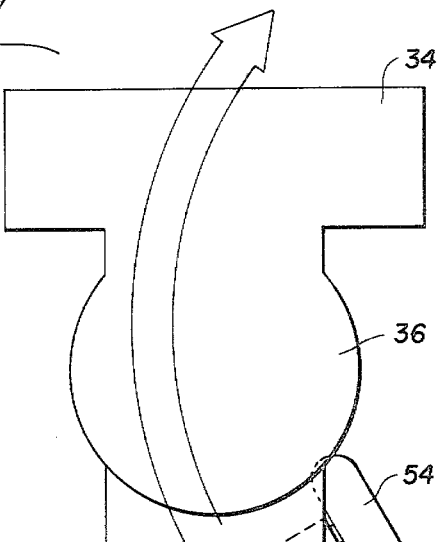
FIG. 7
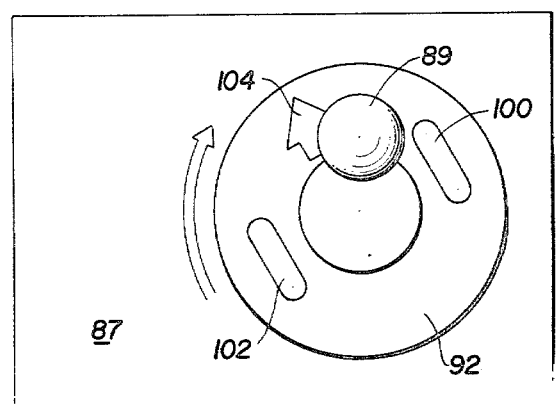
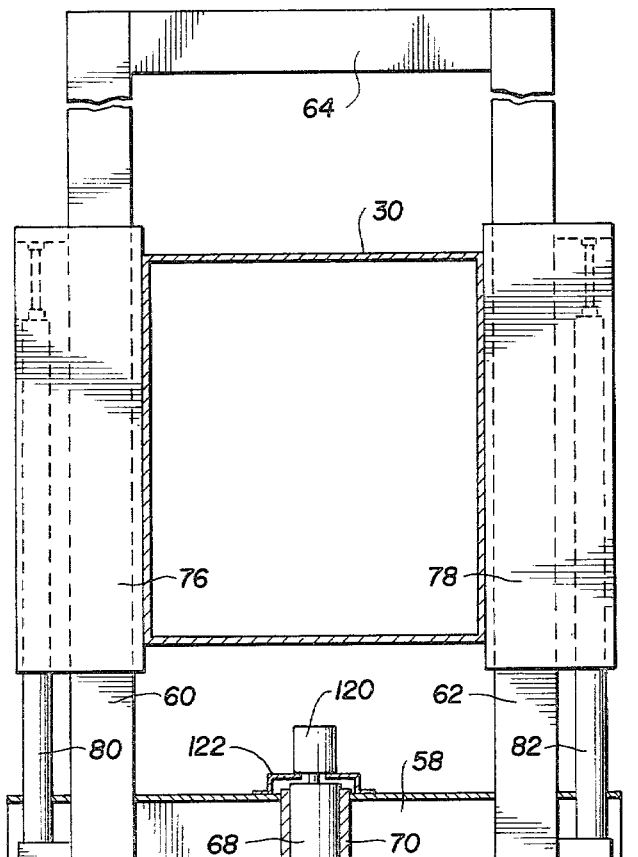
FIG. 3
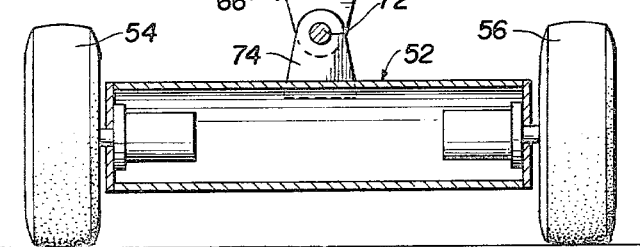

CONVEYANCE LOADER WHEEL POSITION INDICATOR

This invention relates to steering systems for extendible and retractable loading ramps and more particularly to a wheel position indicator system for sensing the position of the undercarriage wheels for the loading ramp and displaying the wheel position at an operator's station in a vestibule carried on the movable end of the ramp.

Conveyance loading ramps of the type employed to provide enclosed tunnels bridging the space between a terminal building and a conveyance vehicle, e.g., an airplane parked on an apron adjacent the terminal, are commonly made up of a plurality of telescoping tunnel sections which are relatively movable to extend and retract the bridge as necessary to position the open end of the bridge tunnel adjacent an access to conveyance vehicles which can be located at differing distances from the terminal building. Since such ramps are most commonly employed in connection with the loading and unloading of passengers onto and from airplanes, the invention will be described herein with respect to such apparatus, it being understood that the loading ramp could also be employed in connection with other conveyance vehicles such as boats or ships.

Known aircraft loading ramps normally have one end pivotally mounted on a fixed support at the terminal building and the other end supported on an undercarriage, sometimes referred to as a buggy, having driven wheels operable to extend and retract the ramp. The wheels enable driving of the outer end of the bridge to and from a loading position adjacent an open door in the airplane.

However, since the bridges are employed to load and unload various types of airplanes, and since such airplanes are not always parked at the same location on the apron or on the same heading, it is generally necessary to make special provision for engaging the airplane at an angle enabling the open end of the tunnel bridge to form a weathertight seal with the airplane around the open door. This is accomplished by an aircraft vestibule mounted on the outer end of the tunnel bridge for limited horizontal swinging movement about a vertical axis to enable the open end of the vestibule to squarely engage the side of the airplane around the door opening regardless of the angular relationship, within limits, of the longitudinal axis of the tunnel bridge with respect to the plane of the airplane door.

Movement of such loading ramps between a retracted position adjacent the terminal building to a passenger loading position is controlled by an operator from an operator's station in a control booth on one side of the aircraft vestibule. The control booth has a transparent windshield which enables the operator to see out the front of the control booth to drive the movable end of the ramp to position the vestibule with respect to the airplane door.

It is frequently desirable, however, for the operator to be able to determine the orientation of the undercarriage wheels for indicating direction of movement without first moving the end of the ramp. This is particularly true during maneuvering the loading ramp in close proximity to an airplane since the size and weight of such ramps can readily damage an airplane. The problem is aggravated by the fact that the airplane vestibule, and consequently the operator's station, may be rotated about its vertical pivotal axis on the end of the ramp so that when standing at the control console and looking straight ahead through the front windshield of the operator's station, the operator may, in fact, be looking in a direction having an angle of up to 90° or more with respect to the longitudinal axis of the loading ramp. With the vestibule disposed at such an angle, and with the undercarriage wheels steered, or positioned at a substantial angle to that direction, driving the undercarriage wheels to move the telescoping ramp section longitudinally could actually drive the vestibule into the side of the airplane.

Thus, for operators to safely maneuver such extendible and retractable loading ramps, they must be constantly aware of the true orientation of the steered wheels regardless of the rotated position of the vestibule, and consequently, of the operator's station. It is, therefore, a primary object of the present invention to provide means for continuously visually displaying at the operator's station the true position of the undercarriage wheels regardless of the angle of rotation of the aircraft vestibule and operator's station about its vertical pivotal axis.

Another object of the invention is to provide such a wheel position indicator which greatly facilitates the maneuverability and control of such aircraft loading ramps.

Another object of the invention is to provide such a wheel position indicator which facilitates reliable and accurate control of the positioning of an aircraft loading ramp.

In the attainment of the foregoing and other objects and advantages of the invention, an important feature resides in providing means for continuously sensing the steering angle of the undercarriage wheels, i.e., the angular deviation of the wheels relative to the longitudinal axis of the loading ramp, and providing a visual display of the true wheel position at the operator's control station in the vestibule regardless of the position of the vestibule about its vertical pivotal axis. The angular position of the vestibule about its vertical pivotal axis relative to the longitudinal axis of the ramp is monitored, and the steering angle and the angular position of the steering wheels are combined algebraically with the angular position of the vestibule so that the display seen by the operator represents the true position of the undercarriage wheels regardless of the orientation of the operator station about the vertical pivotal axis of the vestibule.

Means are provided for sensing the steering angle of the undercarriage and displaying the measured angle at the operator station and means are provided for modifying the displayed angle measurement to compensate for vestibule rotation. In accordance with a preferred embodiment of the invention, a selsyn transmitter is employed to monitor the steering angle and to transmit a signal to a selsyn receiver in the operator's station to drive a wheel position indicator. The signal from the selsyn transmitter is fed to a differential compensator which monitors the angular position of the vestibule and modifies the steering angle signal from the selsyn transmitter to compensate for rotation of the aircraft vestibule so that the selsyn receiver at the operator's station drives the wheel position indicator to the correct position to display the true undercarriage wheel position. This enables the operator to be continuously aware of the undercarriage wheel position and enable more accurate control of the carriage particularly during maneuvering in close proximity to an airplane or the like where accurate steering control is critical.

Other advantages and contributions of the invention will be considered in the following detailed description referring to the accompanying drawings, in which:

FIG. 1 is a side elevation view of an aircraft loading ramp embodying the present invention;

FIG. 2 is a fragmentary perspective view showing a portion of the undercarriage axle assembly of the loading ramp shown in FIG. 1;

FIG. 3 is a sectional view taken on line 3—3 of FIG. 1;

Figure 4:
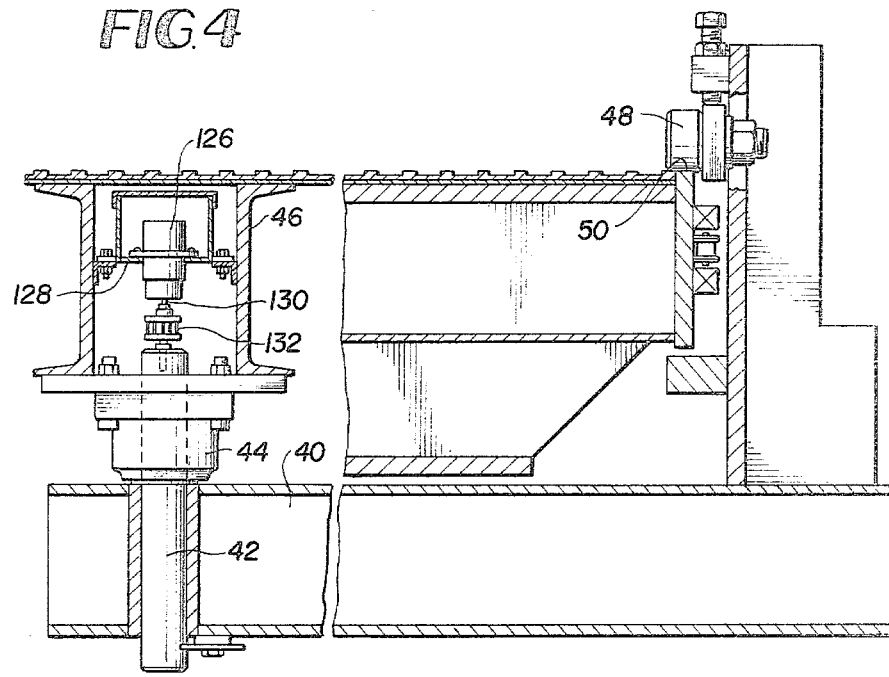
FIG. 4 is a fragmentary sectional view taken on line 4—4 of FIG. 1.

FIG. 7 is a plan view schematically showing the outer end portion of the loading ramp with the undercarriage axle assembly pivoted counterclockwise from the straight forward driving position and illustrating the corresponding position of the wheel position indicator and of the steering and drive control on the control console; and FIG. 8 is a wiring diagram schematically illustrating a differential selsyn drive between the axle assembly and the wheel position indicator.

A retractable aircraft loading ramp 10 embodying the present invention is illustrated in FIG. 1 as extended between a terminal building 12 and an airplane 14 parked on an apron or paved area 16 adjacent the terminal. The inner, or terminal end of the ramp is supported by a pivotal mounting structure 18 and includes a pedestal 20 supporting a terminal vestibule 22.

A platform 24 is rotatably mounted on the upper end of pedestal 20. Platform 24 supports a floor member (not shown) for the vestibule 22 and provides support for the inner end of an inner tunnel section 26 for movement about a horizontal axis and for rotation about the vertical axis of the pedestal 20. This pivotal support and terminal vestibule structure may be of conventional construction and therefore need not be described in greater detail here.

The major longitudinally oriented portion of the loading ramp is made up of the inner tunnel section 26, an intermediate tunnel section 28, and an outer tunnel section 30. The tunnel sections are telescopingly received within one another and supported for simultaneous proportional telescoping movement to expand and retract along the longitudinal dimension of the loader.

The outer end of the ramp is supported by a loader elevator and undercarriage assembly indicated generally at 32. A rotatable aircraft vestibule 34 is mounted outboard of the elevator and undercarriage assembly on an articulating head structure 36 at the outer end of tunnel section 30. An access ladder 38 may be employed to provide access to an operator's control booth in the vestibule 34 through the articulating head from the apron 16.

As best seen in FIGS. 1 and 4, aircraft vestibule 34 is supported on a rigid platform assembly 40 having a vertically extending shaft 42 rigidly mounted thereon and having its upwardly extending end pivotally mounted by a bearing assembly 44 rigidly mounted on the bottom frame structure 46 of articulating head 36.

To further support and stabilize the aircraft vestibule for pivotal movement about the axis of shaft 42, a plurality of rollers 48 mounted on platform 40 engage and roll around a fixed arcuate track 50 carried on the bottom frame 46 of articulating head 36.

The elevator and undercarriage assembly 32 is best seen in FIGS. 1 and 3 and includes a rigid transverse axle assembly 52 supported by a pair of laterally spaced wheels 54, 56 mounted one on each end of the axle assembly for rotation about a common horizontal axis. A rigid, open-centered generally rectangular frame structure including a horizontal base frame member 58, a pair of vertically extending, laterally spaced guide members 60, 62 and a top horizontal frame member 64, is mounted on the axle assembly 52 by a bolster assembly 66 for limited pivotal movement about a vertical axis perpendicular to the axis of rotation of wheels 54, 56 and equally spaced therebetween. Bolster assembly 66 has a vertical pivot pin 68 journaled in a cylindrical bearing sleeve 70 in horizontal frame member 58 and is pivotally mounted on the transverse axle assembly 52, as by pin 72 and brackets 74, for limited pivotal movement about a horizontal axis extending above and transversely of the axle. Guides 60, 62 receive and support the lower end portions of a pair of vertical frame members 76, 78 rigidly mounted one on each side of the outer end portion of outer tunnel section 30 and a pair of hydraulic cylinders 80, 82 are provided for moving the structural frame members 76, 78 vertically along guides 60, 62, respectively, to raise or lower the outer end of the loader 10 as desired to position the vestibule 34 at the desired level with respect to the door of aircraft 14. Since frame members 76, 78 are rigidly mounted on the outer tunnel section, and since these members are snugly received for sliding movement along the guide members 60, 62, the telescoping loader can be moved longitudinally of itself, within limits provided by suitable stops, by driving the wheels 54, 56 about their common axis, with the guides 60, 62 and frame members 76, 78 cooperating to maintain the elevator and undercarriage assembly 32 in its upright position and to transfer the driving force from the wheels to the outer tunnel section.

A pair of reversible, variable speed motors 84, 86 are mounted in the axle assembly 52, with motor 84 being connected to wheel 54 and motor 86 connected to wheel 56 to drive the wheels about their common axis. Suitable control means is provided to supply power to wheel motors 84, 86 to extend or retract the ramp, as desired, at the desired rate. Also, means is provided for varying the speed of the wheel motors 84, 86 with respect to one another to pivot axle assembly 52 about the vertical axis of pin 68 to steer the moving undercarriage during such expanding and retracting movement. The control system also preferably includes means for simultaneously driving the wheel motors in opposite directions at the same rate to thereby pivot the axle assembly 52 about the vertical axis of pin 68 to change the steering angle of the wheels without extending or retracting the ramp. A suitable control system for the wheel motors is disclosed in copending application entitled "Conveyance Loader Drive and Steering System", filed concurrently herewith.

Figure 5:
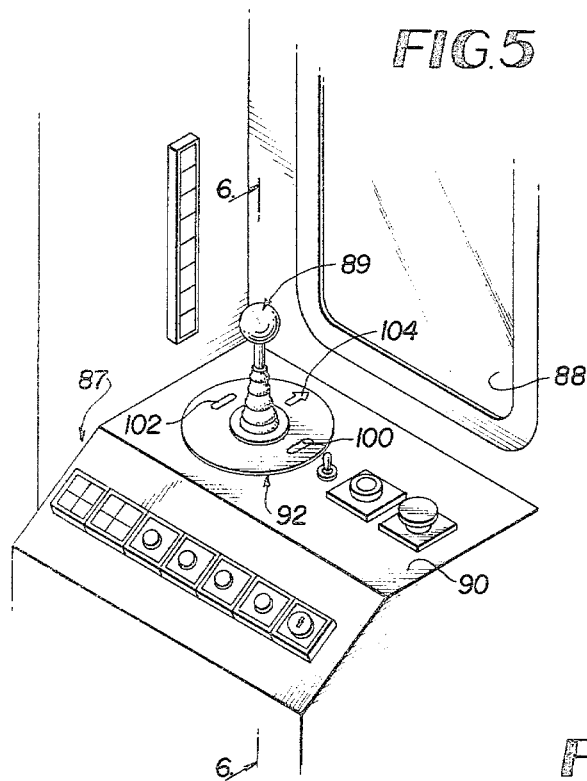
FIG. 5 is a fragmentary perspective view of a control console in an operator's booth on the pivotally mounted aircraft vestibule of the loading ramp.
Figure 6:
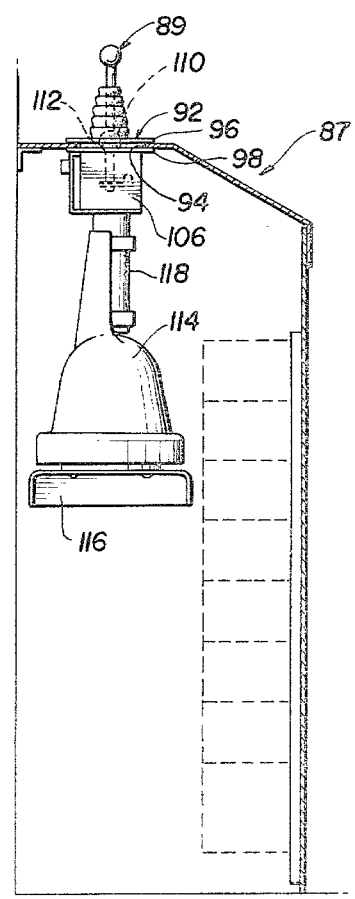
FIG. 6 is a fragmentary sectional view taken on line 6—6 of FIG. 5.

Referring to FIG. 5, a loading ramp control console is designated generally by the reference numerals 87 and is enclosed within an operator's booth having a transparent windshield 88 in the front wall thereof, i.e., the wall parallel to the outer open end of the vestibule which is positioned in juxtaposition to an aircraft when the ramp is in the loading and unloading position. A single joy stick control lever 89 is mounted on and projects upwardly from the top horizontal surface 90 of the control console 87. Joy stick 89 extends through the center of a circular wheel position indicator disc 92 which is rotatably supported in a circular opening 94 as best seen in FIG. 6. Disc 92 is provided with a pair of spaced, radially extending flanges 96, 98 which are disposed in closely spaced relation to the top and bottom surfaces, respectively, of panel 92 adjacent the periphery of the circular opening 94 to support the disc 92 and joy stick 89 for rotation concentrically within the opening. A pair of decals 100, 102 or other suitable wheel position indicator markings representing the wheels 54, 56, respectively are carried on the top surface of the disc 92 adjacent the outer periphery thereof, with the decals located in diametrically opposed relation to one another. Wheel indicator markings 100, 102 represent, on a reduced scale, a top plan view of the carriage wheels. A third indicator marking in the form of a radially directed arrow 104 indicates the direction of movement of wheels 54, 56 upon movement of the joy stick 89 to extend the ramp.

An instrument housing 106 is mounted on the undersurface of disc 92 and projects downwardly therefrom within the interior of the control console 87. Joy stick 89 is universally mounted intermediate its ends in a central opening 108 in disc 92. A spherical mounting ball 110 is formed integrally with or rigidly mounted on joy stick 89 intermediate its ends, and the spherical ball 110 is received in a socket 112 in the opening 108 to form the universal, or ball-and-socket support for the lever. The bottom end portion of joy stick lever 89 extends below the wheel position indicator disc 92 to actuate suitable controls, not shown, for the wheel motors 84, 86 as described above. Thus, the joy stick control 89 and the instrument housing 106, along with the steering and drive control instruments contained in the housing, are supported for rotation with wheel position indicator disc 92.

A selsyn motor, or receiver 114, as its stator rigidly mounted on a support bracket 116 within the control console 87 and its rotor connected, through vertical shaft 118, to the bottom of instrument housing 106. Thus, rotation of the rotor of selsyn motor 114 produces a corresponding rotation of the instrument housing, joy stick control and the wheel position indicator disc.

As shown in FIGS. 2 and 3, a second selsyn motor, or transmitter 120 has its stator rigidly mounted on frame member 58 of the undercarriage assembly by bracket 122 and its rotor connected, through vertical shaft 124 to pin 68 for rotation thereby upon steering movement of the axle assembly 52 about the vertical axis of pin 68.

As seen in FIG. 4, a differential selsyn 126 has its stator rigidly mounted in coaxial relation with shaft 42 by bracket 128 fixed on frame 46. The cylindrical type, three-phase rotor of differential selsyn 126 is connected to the end of shaft 42, through shaft 130 and coupling 132 for rotation by shaft 42 so that pivotal movement of the aircraft vestibule 34 about its pivotal mounting produces relative rotation between the three-phase rotor and three-phase stator windings of the differential selsyn.

As shown schematically in FIG. 7, the rotors of selsyn motor receiver 114 and transmitter 120 have their conventional single phase, salient pole rotors connected to the same single phase AC power supply indicated by the lines 134, 136. Also, the three-phase stator windings of the transmitter and the differential selsyns are connected, phase-to-phase, through wires 138, 140 and 142, and the three-phase windings of the cylindrical rotor of differential selsyn 126 are connected, phase-to-phase, to the three-phase stator windings of receiver 114 through lines 144, 146 and 148. Selsyn motors and this type of selsyn motor circuit are conventional, see for example, *The Electrical Engineer's Reference Book*, (11th ed. 1964, pgs. 8.56–8.58), published by George Newnes Ltd., London, England.

In operation of the aircraft loader ramp, pivotal movement of the axle assembly 52 resulting from unequal rotation or driving motion of the wheels 54, 56 will cause differential rotation between the stator and rotor of selsyn transmitter 120 and produce an upset in the balance of stator current between the transmitter 120 and receiver 114, producing a torque in selsyn receiver 114 causing a corresponding rotation of its rotor to rotate the shaft 118 and consequently the wheel position indicator disc 92 and the joy stick control 89. Thus, the wheel position indicators 100, 102 remain in the same relative orientation, or bearing, as their corresponding wheels 54, 56, respectively, and the arrow 104 continues to point in the direction of heading of the axle assembly. At the same time, any rotation of aircraft vestibule 34 about the pivotal axis of shaft 42 produces relative movement between the three-phase windings of the stator and rotor of the differential selsyn 126 which produces a corresponding counter-rotation of the rotor of the receiver selsyn 114 so that, although the wheel position indicator disc and joy stick are physically moved about the rotary axis of the aircraft vestibule, this rotation produces a counter-rotation of the selsyn receiver which results in the orientation, or bearing, of the disc and joy stick control remaining unchanged and the wheel position indicated by the indicator markings 100, 102 continued to accurately represent the true position of the wheels 54, 56.

Operation of the control system is such that, when the vestibule 34 is oriented on the longitudinal axis of the ramp, and with the axle assembly 52 disposed transversely of the longitudinal axis of the ramp, arrow 104 will point straight ahead toward the windshield 88, or directly away from an operator standing behind the console 87. In this position, movement of the joy stick 89 straight forward, i.e., in a vertical plane parallel to the longitudinal axis of the ramp, will drive wheels 54, 56 straight forward to longitudinally extend the ramp, with the extent of forward movement of the joy stick controlling the velocity of such movement in a known manner. Similarly, movement of the joy stick rearwardly, or in a direction opposite to arrow 104 will produce reverse motion of the drive wheels to cause straight line retraction movement of the ramp. However, if the joy stick is moved to the left or right simultaneously with forward or rearward movement, the wheels 54, 56 will be driven at an unequal rate to produce a pivotal action of the axle assembly 52 to steer the end of the ramp in the direction of tilting of the joy stick as the ramp is extended or retracted. Steering of aircraft loading ramp undercarriages by driving the wheels at different rates is known as illustrated, for example, in U.S. Pat. No. 3,123,167.

Pivotal movement of the axle assembly is sensed by the selsyn transmitter 120 and reproduced by selsyn receiver 114 to rotate the wheel position indicator disc 92 and continuously produce an accurate visual representation of the actual wheel position at the operator's station. The arrangement of the single joy stick control in the center of the wheel position indicator disc and supporting the joy stick control for movement therewith results in not only providing an accurate representation of the wheel position on a continuous basis, but also enables the operator to determine at a glance the extent and direction of movement of the joy stick control necessary or desired to produce the steering movement necessary.

As stated above, the steering and drive control system preferably employs control means for pivoting the axle assembly by equal and opposite rotation of the wheels to change the steering angle without moving the movable end of the ramp. Such pivotal movement is, of course, followed by the wheel position indicator disc and control assembly in the operator station in the manner described. The operator can thus position the wheels at any desired orientation merely by observing the wheel position indicator in the control booth before moving the ramp. This enables accurate control of movement of the ramp with minimum risk of damage to an aircraft when maneuvering in close proximity to the aircraft.

Although a simple electrical system, namely a conventional differential selsyn motor circuit system, has been described to produce the wheel position display in the operator's station, other systems could readily be employed. For example, a cable system, a sprocket and chain drive, or a fluid circuit drive could be employed to accurately reproduce the steering movement of the axle assembly and to compensate for pivotal movement of the aircraft vestibule about its pivotal axis. Accordingly, while a preferred embodiment of the invention has been disclosed and described, it is to be understood that the invention is not to be restricted solely thereto but rather is intended to include all embodiments obvious to one skilled in the art from the above teachings. Therefore the scope of the invention should be determined from the appended claims.

I claim:

1. Conveyance loading structure comprising a longitudinally extensible and retractable conveyance loading ramp having a movable end supported on an undercarriage having an axle assembly mounting ground engaging wheels,
   pivot means supporting the axle assembly on the undercarriage for steering movement about a generally vertical pivot axis,
   drive means connected with and operable to rotatably drive the ground engaging wheels,
   a vestibule mounted at the movable end of the ramp for engaging and providing access to a conveyance, and
   manually operated control means at an operator's station in the vestibule and operably connected with the drive means for controlling movement of the movable end of the loading ramp,
   the control means including
   actuator means for controlling operation of the drive means to control driving movement of the wheels and steering movement of the axle assembly, and
   undercarriage wheel position indicator means connected between the axle assembly and the vestibule,
   such wheel position indicator means including
   detecting means continuously determining the rotative position of the axle assembly about its vertical pivot axis,
   display disc means rotatably mounted at the operator's station in the vestibule, and
   display disc drive means responsive to said detecting means for detecting steering movement of the axle assembly about its pivot axis and providing corresponding rotation of the display disc means,
   the display disc means presenting wheel position indicia continuously providing a visual display of the true bearing of the undercarriage wheels.

2. The structure of claim 1 wherein such actuator means comprises
   a joy stick actuating lever manually operable to control both driving movement of the ground engaging wheels and steering movement of the axle assembly,
   such joy stick actuating lever being mounted within and extending through an opening in the disc means.

3. The structure of claim 2 further comprising
   means mounting the actuator means including the joy stick actuating lever for rotational movement with the display disc means.

4. The structure of claim 3 wherein
   the vestibule is mounted on an articulating head for rotation about a generally vertical pivot axis laterally spaced from the vertical pivot axis of the axle assembly.

5. The structure of claim 4 wherein the control means further comprises
   compensator means responsive to rotary movement of the vestibule about its vertical pivotal axis for producing substantially equal and opposite rotation of the disc means such that the wheel bearing indicated by the wheel position indicia on the display disc means is unaffected by rotation of the vestibule about its vertical pivot axis.

6. The structure of claim 5 wherein such undercarriage axle assembly detecting means comprises a selsyn transmitter and wherein the wheel position display means comprises a selsyn receiver operably connected to the selsyn transmitter to rotate the display disc means in response to rotation of the undercarriage axle assembly about its vertical pivot axis.

7. The structure of claim 6 wherein the compensator means comprises
   a differential selsyn connected between the selsyn transmitter and the selsyn receiver,
   the differential selsyn being connected between the vestibule and the movable end of the ramp whereby rotation of the vestibule about its vertical pivot axis produces corresponding relative rotation between rotor and stator means of the differential selsyn.

8. The structure of claim 1 wherein the undercarriage axle assembly is supported by a pair of ground engaging wheels rotatable about a common axis and the vestibule is mounted on an articulating head at the movable end of the loading ramp for rotation about a generally vertical pivot axis laterally spaced from the pivot axis of the undercarriage axle assembly.

9. The structure of claim 8 wherein the control means further comprises
   compensator means responsive to rotary movement of the vestibule about its pivot axis and operatively connected between the wheel position display means in the vestibule and the wheel position detecting means to compensate for movement of the vestibule about its pivot axis.

10. Conveyance loading structure comprising a longitudinally extensible and retractable conveyance loading ramp having a movable end supported on an undercarriage having an axle assembly mounting ground engaging wheels rotatable about a common axis, pivot means supporting the axle assembly on the undercarriages for steering movement about a generally vertical pivot axis, drive means connected with and operable to drive the ground engaging wheels, a vestibule mounted on an articulated head at the movable end of the loading ramp for rotation about a generally vertical pivot axis laterally spaced from the pivot axis of the undercarriage axle assembly to position the vestibule for engaging and providing access to a conveyance, and manually operated control means at an operator's station in the vestibule and operably connected with the drive means for controlling movement of the movable end of the loading ramp, the control means including actuator means for controlling operation of the drive means to control driving movement of the wheels and steering movement of the axle assembly, undercarriage wheel position indicator means connected between the axle assembly and the vestibule, and compensator means responsive to rotary movement of the vestibule about its pivot axis and operatively connected between the wheel position display means in the vestibule and the wheel position detecting means to compensate for movement of the vestibule about its pivot axis, such wheel position indicator means including detecting means including a selsyn transmitter continuously determining the rotative position of the axle assembly about its vertical pivot axis, and undercarriage wheel position display means including a selsyn receiver in the vestibule, the selsyn receiver being operably connected with and responsive to the selsyn transmitter to position the display means to continuously indicate the true position of the undercarriage wheels.

11. The structure of claim 10 wherein the compensator means comprises a differential selsyn connected between the selsyn transmitter and the selsyn receiver, the differential selsyn being connected to the vestibule so that rotation of the vestibule about its vertical pivot axis produces corresponding relative rotation between rotor and stator means of the differential selsyn.

12. The structure of claim 10 wherein such actuator means comprises a joy stick actuating lever operable to control both driving movement of the wheels and steering movement of the axle assembly, and wherein the joy stick is mounted within and extends through an opening in the disc means.

* * * * *